US007829036B2

(12) United States Patent
Kumar et al.

(10) Patent No.: US 7,829,036 B2
(45) Date of Patent: Nov. 9, 2010

(54) FLUID JET CUTTING PROCESS

(75) Inventors: Amit Kumar, Amherst, NY (US); Scott Lee Misenar, South Bend, IN (US)

(73) Assignee: Unifrax I LLC, Niagara Falls, NY (US)

( * ) Notice: Subject to any disclaimer, the term of this patent is extended or adjusted under 35 U.S.C. 154(b) by 1122 days.

(21) Appl. No.: 11/452,802

(22) Filed: Jun. 14, 2006

(65) Prior Publication Data

US 2007/0006699 A1 Jan. 11, 2007

Related U.S. Application Data

(60) Provisional application No. 60/690,234, filed on Jun. 14, 2005.

(51) Int. Cl.
*B01D 50/00* (2006.01)
*B01D 51/16* (2006.01)

(52) U.S. Cl. .......................................... 422/179; 29/890

(58) Field of Classification Search ................. 422/168, 422/177, 179, 180
See application file for complete search history.

(56) References Cited

U.S. PATENT DOCUMENTS

| | | | |
|---|---|---|---|
| 3,532,014 | A | 10/1970 | Franz |
| 5,417,607 | A | 5/1995 | Raghavan et al. |
| 5,961,053 | A | 10/1999 | Raghavan et al. |
| 6,019,298 | A | 2/2000 | Raghavan et al. |
| 6,103,049 | A | 8/2000 | Batdorf |
| 6,280,302 | B1 | 8/2001 | Hashish et al. |
| 6,299,510 | B1 | 10/2001 | Massenburg |
| 6,375,547 | B1 | 4/2002 | Massenburg |
| 6,464,567 | B2 | 10/2002 | Hashish et al. |
| 6,752,686 | B1 | 6/2004 | Hashish et al. |
| 6,755,725 | B2 | 6/2004 | Hashish et al. |
| 6,766,216 | B2 | 7/2004 | Erichsen et al. |
| 6,835,413 | B2 | 12/2004 | Patel |
| 6,875,084 | B2 | 4/2005 | Hashish et al. |
| 6,945,859 | B2 | 9/2005 | Hashish et al. |
| 6,996,452 | B2 | 2/2006 | Erichsen et al. |
| 2001/0046833 | A1 | 11/2001 | Hashish et al. |
| 2003/0037654 | A1 | 2/2003 | Sciulli et al. |
| 2003/0148709 | A1 | 8/2003 | Anand et al. |
| 2004/0057879 | A1 | 3/2004 | Aizawa et al. |

*Primary Examiner*—Tom Duong
(74) *Attorney, Agent, or Firm*—Curatolo Sidoti Co., LPA; Salvatore A. Sidoti; Joseph G. Curatolo

(57) ABSTRACT

A fluid jet cutting process for fibrous materials, such as inorganic fibrous material articles is provided. A fluid composition for use in the fluid jet cutting process is also provided. The cutting fluid composition contains a carrier fluid and coating composition for the cut surfaces of the fibrous material. An apparatus for carrying out the fluid jet cutting process of fibrous materials is also provided.

24 Claims, 4 Drawing Sheets

FLUID JET CUTTING PROCESS

CROSS REFERENCE TO RELATED APPLICATIONS

This application claims the benefit of the filing date under 35 U.S.C. §119(e) from U.S. Provisional Application For Patent Ser. No. 60/690,234 filed on Jun. 14, 2005, which is hereby incorporated by reference in its entirety.

BACKGROUND

Disclosed is a fluid jet cutting process. More particularly, disclosed is a fluid jet cutting process for fibrous materials and a fluid composition for use in the fluid jet cutting process.

The process of fluid jet cutting, also known as water jet cutting or liquid jet cutting, was developed in the 1970s. The process involves pressurizing a fluid to pressures generally in the range of about 10,000 to about 60,000 psi and emitting the pressurized fluid from a nozzle of a fluid jet apparatus to cut a material.

Related to the process of fluid jet cutting is the process of abrasive jet cutting. Like the fluid jet cutting process, a fluid is pressurized to a very high pressure. Abrasive particles are entrained in the pressurized fluid prior to exiting the nozzle of the cutting apparatus. The addition of the abrasive particles to the cutting fluid enables the process to cut through much harder materials such as metals, metal alloys, ceramics, and plastics.

For many years, inorganic fibrous materials have been utilized in thermal, electrical, and acoustical insulation applications. Inorganic fibrous materials have also been used in automotive exhaust gas treatment device applications. Depending on the particular application, the inorganic fibrous materials may be processed into any number of product forms such as blankets, boards, felts, mats, industrial textiles, and the like.

Devices for treating exhaust gases of automotive and diesel engines generally contain a housing and fragile catalyst support structure for holding the catalyst that is used to effect the oxidation of carbon monoxide and hydrocarbons and the reduction of oxides of nitrogen in the exhaust gases. The fragile catalyst support structure is mounted within the gap or space between the interior surface of the housing and the external surface of the fragile catalyst support structure by a mounting or support material.

In order to protect the fragile catalyst support structure from thermal and mechanical shock and other stresses experienced during normal operation of an automotive or diesel engine, it is known to position at least one ply or layer of inorganic fibrous material within the gap between the fragile catalyst support structure and the housing to protect the fragile catalyst support structure and otherwise hold it in place within the housing.

The fibrous materials used to mount the fragile catalyst support structure within the housing of the exhaust gas treatment device are generally processed by die cutting or stamping into an appropriate size and shape for incorporation into an exhaust gas treatment device. Due to the relatively brittle nature of the inorganic fibrous materials, such as refractory ceramic fibers, the die cutting or stamping process may produce an airborne particulate dust. This particulate dust may be irritating to the skin, eyes, and respiratory tract, and poses concerns for the workers manufacturing the mats and those installing the fibrous mats in the exhaust gas treatment devices.

Therefore, a need exists in the art for an improved process that is capable of providing intricate and precise cuttings of fibrous inorganic materials, while minimizing irritable airborne fiber dust generation traditionally associated with die cutting or stamping of these inorganic materials.

SUMMARY

A process for reducing dust generation from an inorganic fibrous material during cutting of said inorganic fibrous material is provided, said process comprises contacting said inorganic fibrous material with a pressurized fluid jet, and cutting said inorganic fibrous material with said fluid jet.

A fluid jet cutting process is provided, the process comprises contacting a fibrous material with a pressurized fluid jet, wherein said fluid jet contains a carrier fluid and a coating agent for said fibrous material, and cutting said fibrous material with said fluid jet.

According to another embodiment, a fluid composition for high pressure fluid jet cutting of fibrous materials is also provided, the fluid composition comprising a carrier fluid and a coating agent for said fibrous materials.

According to a further embodiment, an apparatus for fluid jet cutting of fibrous materials is provided, said apparatus comprises a pump for creating a pressurized fluid jet, a reservoir containing a cutting fluid for said fibrous materials, said cutting fluid optionally incorporating a coating composition, and a nozzle having and inlet to receive said cutting fluid and an outlet for emitting said cutting fluid onto a fibrous substrate.

The fluid jet cutting apparatus may comprise a pump for creating a pressurized fluid jet, reservoirs for separately containing said cutting fluid and said coating composition, a nozzle having a first inlet for receiving a pressurized fluid jet of said cutting fluid, a second inlet for receiving said coating composition, and a volume for combining said cutting fluid and coating composition, and an outlet emitting said fluid jet and coating composition.

According to further embodiments, the fluid jet cutting process comprises contacting a fibrous material with a pressurized fluid jet, wherein said fluid jet contains a carrier fluid and a desired agent for said fibrous material, cutting said fibrous material with said fluid jet, and depositing said desired agent on at least a portion of said fibrous material.

A fluid jet cut fibrous mounting mat for exhaust gas treatment devices is also provided, wherein said mounting mat comprises a coating deposited on at least a portion of fluid jet cut edge surfaces.

An exhaust gas treatment device comprising a housing, a fragile catalyst support structure resiliently mounted within said housing; and a fluid jet cut inorganic fibrous mounting mat disposed in a gap between said housing and said fragile catalyst support structure, wherein said mounting mat further comprises a coating deposited on at least a portion of fluid jet cut edge surfaces.

DETAILED DESCRIPTION

Figure 1A:
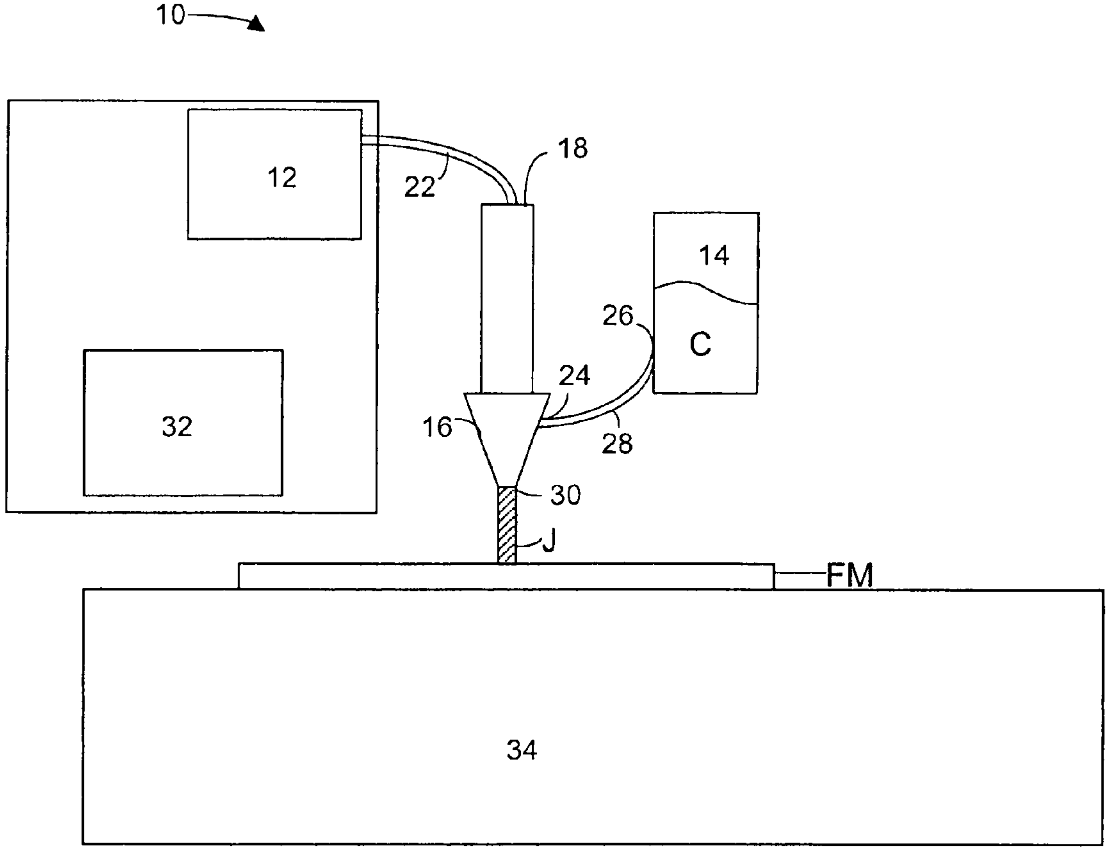
FIG. 1A depicts one illustrative embodiment of the fluid jet cutting apparatus.

A fluid jet cutting process is utilized to cut fibrous materials. The fluid jet cutting process includes contacting or otherwise exposing a surface of a fibrous material to a high pressure fluid jet stream and cutting the fibrous material with the pressurized fluid jet along a predetermined cut path. As the fluid jet cuts through the fibrous material along the predetermined cut path, a desired agent is simultaneously deposited on at least a portion of the edge surfaces of the fibrous material that is exposed by the fluid jet cutting process.

According to illustrative embodiments, the fluid jet cutting process includes contacting or otherwise exposing a surface of a fibrous material to a high pressure fluid jet stream and cutting the fibrous material with the pressurized fluid jet along a predetermined cut path. As the fluid jet cuts through the fibrous material along the pre-determined cut path, a coating agent is deposited on at least a portion of the edge surfaces of the fibrous material that is exposed by the fluid jet cutting process.

The edge surfaces of the fibrous material absorb the coating agent by a wicking process. After the fibrous material has been cut by the fluid jet process, the cut pieces of fibrous material are removed from the fluid jet cutting apparatus and are dried to remove any excess moisture absorbed during the cutting process. The cut fibrous material may be dried by any conventional drying process, such as air drying and heat drying in an oven. Once the cut fibrous material has dried, the coating agent forms a seal on the exposed edges of the fibrous material.

There is no required minimum pressure of the fluid jet stream created by the pump of the fluid jet cutting apparatus for cutting the fibrous substrates. The jet stream created by the pump and emitted from the output nozzle of the fluid jet cutting apparatus is simply pressurized to a sufficient pressure to cut a fibrous substrate, or a stack or fibrous substrates, having a predetermined thickness to meet desired application tolerances. One having ordinary skill in the art can easily select an appropriate pressure, based on the thickness of the fibrous substrate(s) desired to be cut with the fluid jet cutting apparatus.

According to certain embodiments, without limitation, the fluid jet stream created by the pump and emitted from the nozzle of the fluid jet cutting apparatus is pressurized to a pressure of 5,000 psi or greater. According to other embodiments, the fluid jet stream created by the pump and emitted from the output of the nozzle of the fluid jet cutting apparatus is pressurized to a pressure of at least 10,000 psi. According to further embodiments, the fluid jet stream may be pressurized to a pressure of at least 60,000 psi. By using a pressurized fluid jet stream, it is possible to make precise cuts through the entire thickness of a fibrous material article.

Depending on the particular application, the fibrous material may be cut into a wide variety of product forms. Accordingly, the fluid jet cutting process is suitable for cutting any number of inorganic fibrous material product forms such as, without limitation, fibrous blankets, boards, felts, mats, industrial textiles, and the like.

The fluid composition for the high pressure fluid jet cutting process includes a carrier fluid and a coating agent for the fibrous materials. In most instances, the carrier fluid of the fluid jet cutting composition will be water, as water is cost effective, environmentally friendly, and chemically inert with the component parts of the fluid jet cutting apparatus and the fibrous mat. It should be noted, however, that any other carrier fluid that is chemically inert with fluid jet apparatus and the fibrous material being cut may be utilized.

The fluid jet cutting composition also contains a coating composition for the fibrous material being cut by the process. Without limitation, the coating composition included in the fluid jet cutting composition may comprise any coating composition that is compatible with the carrier fluid, that is chemically inert to the fluid jet apparatus and fibrous material being cut, and that is traditionally utilized to coat the surfaces of inorganic fibrous materials. Without limitation, suitable coating compositions include polymer coating material solutions or suspensions. Without limitation, suitable polymer coating materials which may be included in the fluid jet cutting composition include solutions or suspensions of acrylic polymers, methacrylic polymers, polyvinyl alcohol, starch polymers, urethane polymers, vinyl acetate polymers, and latexes. Without limitation, a suitable latex that may be utilized as the coating composition in the fluid jet cutting process is an acrylic latex. According to certain embodiments, the fluid jet cutting composition contains water as the carrier fluid and an acrylic latex as the coating material for the fibrous material.

The fluid jet cutting composition may or may not include an abrasive material. According to certain embodiments wherein the fluid jet cutting composition does not contain an abrasive material, the cutting process utilizing such fluid composition is considered to be a non-abrasive fluid jet cutting process. The inclusion of an abrasive material in the fluid jet will enable the process to cut much thicker fibrous materials, while still being able to simultaneously deposit a layer of coating agent along the exposed edges of the fibrous material mat.

According to other embodiments, an apparatus for fluid jet cutting of fibrous materials is provided. The fluid jet cutting apparatus includes a pump for creating a high pressure fluid jet. A reservoir is provided for storing and releasing the coating agent for the fibrous materials being cut by the fluid jet cutting apparatus. A nozzle having a first inlet is provided in fluid connection with the pump for creating the high pressure fluid jet. The nozzle includes a second inlet in fluid connection with the reservoir for storing the coating composition. The first inlet of the nozzle receives the pressurized fluid jet from the pump, which is delivered through high pressure plumbing or conduit in fluid connection between the pump and the nozzle. The second inlet of the nozzle is for receiving the coating composition that is delivered from the holding reservoir for the coating composition. The outlet of the holding reservoir is connected to the second inlet of the nozzle via suitable plumbing or conduit. Within the nozzle of the apparatus, the fluid jet and the coating composition are combined. The fluid jet containing a combination of the carrier fluid, the coating composition, and optionally an abrasive materials, is emitted through the outlet of the nozzle and is directed toward the surface of the fibrous material article to be cut.

The fluid jet cutting apparatus also includes a controller for controlling the movement of the nozzle relative to the fibrous material. Without being limited to any particular embodiment, the controller of the fluid jet cutting apparatus may be a computer or processor installed with appropriate software or firmware to control the movement of the cutting nozzle of the apparatus relative to the fibrous material along a predetermined cut path.

The fluid jet cutting apparatus may further include a container or "catch tank" having a suitable volume to collect the cutting fluid as it passes through the thickness of the fibrous substrate material being cut by the fluid jet cutting process. The container should be capable of collecting the volume of cutting fluid generated in the cutting process, and at the same time, preventing back-splash of the cutting fluid onto surfaces of the cut fibrous materials facing the container.

According to further embodiments, where higher jet stream pressures may be utilized, the catch tank of the fluid jet cutting apparatus further functions to dissipate the energy of the fluid jet after the fluid jet cuts through the fibrous material cut. In most cases, contained within the catch tank is a sufficient amount of water to dissipate the energy from the high pressure fluid jet. As the high pressure fluid jet cuts through the fibrous material, the jet continues to be directed into the catch tank and the energy of the fluid jet is absorbed by the water contained within the tank. The volume of water contained within the catch tank should be optimized to maximize energy dissipation, while avoiding back splash of cutting fluid or water from the catch tank onto surfaces of the cut fibrous material.

The process, apparatus and mats will be described in greater detail with reference to the Figures. It should be noted, however, that the disclosed apparatus and cutting process are not limited to the illustrative embodiments shown in the Figures.

FIG. 1A shows one illustrative embodiment of the fluid jet cutting apparatus 10. The fluid jet cutting apparatus 10 includes a pump 12 for creating a high pressure fluid jet. A reservoir or holding tank 14 is provided for storing and releasing the coating composition C for the fibrous materials being cut by the fluid jet cutting apparatus 10. A nozzle 16 having first 18 and second 20 inlets is in fluid connection with the pump 12 for creating the high pressure fluid jet and the reservoir 14 for storing the coating composition C. The first inlet 18 of the nozzle 16 receives the pressurized fluid jet J from the pump 12. The pressurized fluid jet J is delivered through high pressure plumbing or conduit 22 that is in fluid connection between the pump 12 and the nozzle 16.

A second inlet 24 of the nozzle 16 receives the coating composition C from the coating composition holding reservoir 14 of the fluid jet cutting apparatus 10. The holding reservoir 14 has an outlet 26 which is connected to the second inlet 24 of the nozzle 16 via plumbing or conduit 28. Within the nozzle 16 of the apparatus 10, the fluid jet J and the coating composition C are combined and are emitted in the direction of the surface of the fibrous material through the outlet 30 of the nozzle 16.

The fluid jet cutting apparatus also includes a controller 32 for controlling the movement of the nozzle 16 relative to the fibrous material FM being cut by the apparatus 10.

A catch tank 34 is located below the fibrous material FM being cut. As the fluid jet cuts through the fibrous material FM the jet continues into the tank 34 where the cutting fluid is collected, and optionally the energy of the fluid is absorbed by the water W in the tank.

Figure 1B:
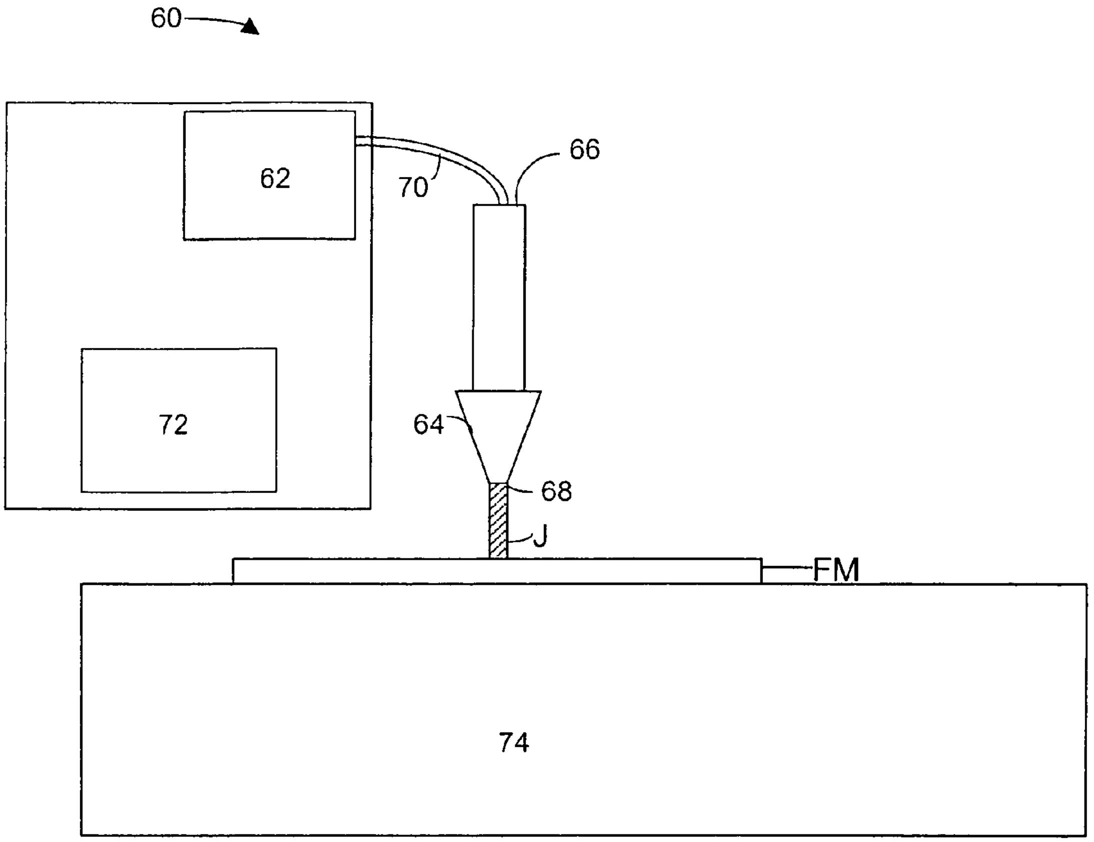
FIG. 1B depicts another illustrative embodiment of the fluid jet cutting apparatus.

FIG. 1B shows another illustrative embodiment of the fluid jet cutting apparatus 60. The fluid jet cutting apparatus 60 includes a pump 62 for creating a high pressure fluid jet. According to the illustrative embodiment of FIG. 1B, the coating composition may be previously incorporated into the cutting fluid. Therefore, a separate reservoir or holding tank is not required for storing and releasing the coating composition C for the fibrous materials being cut by the fluid jet cutting apparatus 60. A nozzle 64 having an inlet 66 and outlet 68 is in fluid connection with the pump 62 for creating the high pressure fluid jet. Inlet 66 of the nozzle 64 receives the pressurized fluid jet J from the pump 62. The pressurized fluid jet J is delivered through high pressure plumbing or conduit 70 that is in fluid connection between the pump 62 and the nozzle 64. The fluid jet J containing the combination of cutting fluid and coating composition is emitted in the direction of the surface of the fibrous material through the outlet 68 of the nozzle 64.

The fluid jet cutting apparatus also includes a controller 72 for controlling the movement of the nozzle 64 relative to the fibrous material FM being cut by the apparatus 60. A catch tank 74 is located below the fibrous material FM being cut. As the fluid jet cuts through the fibrous material FM the jet continues into the tank 75 where cutting fluid is collected. In certain embodiments, the energy of the fluid jet is absorbed by the water W in the tank.

Figure 2A:
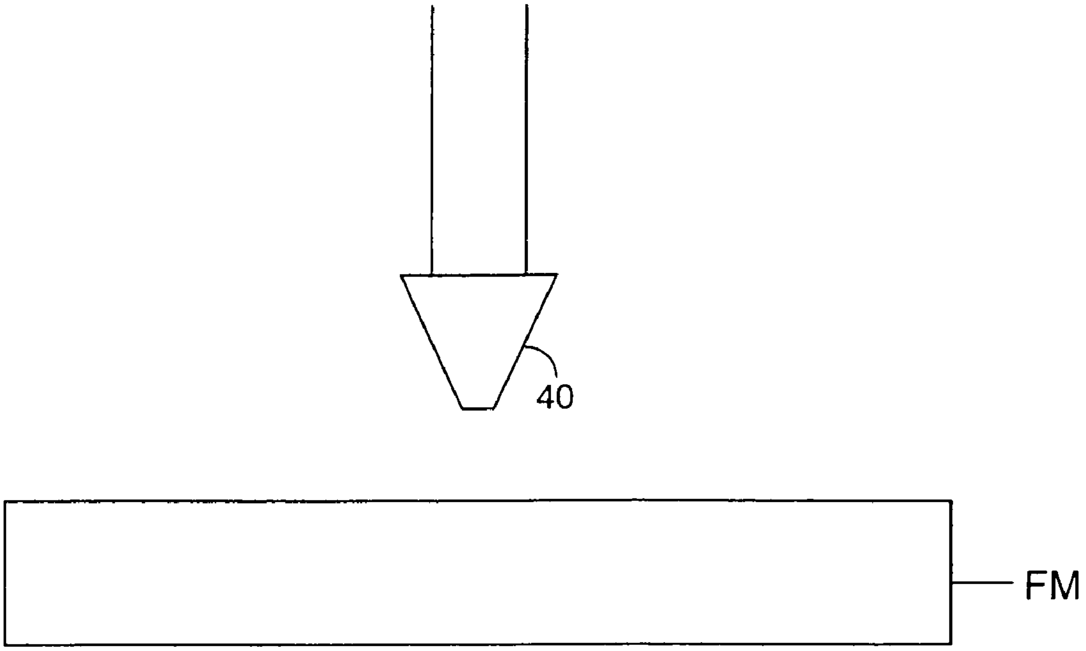
FIGS. 2A-2C depict one illustrative embodiment of the fluid jet cutting process.
Figure 2B:
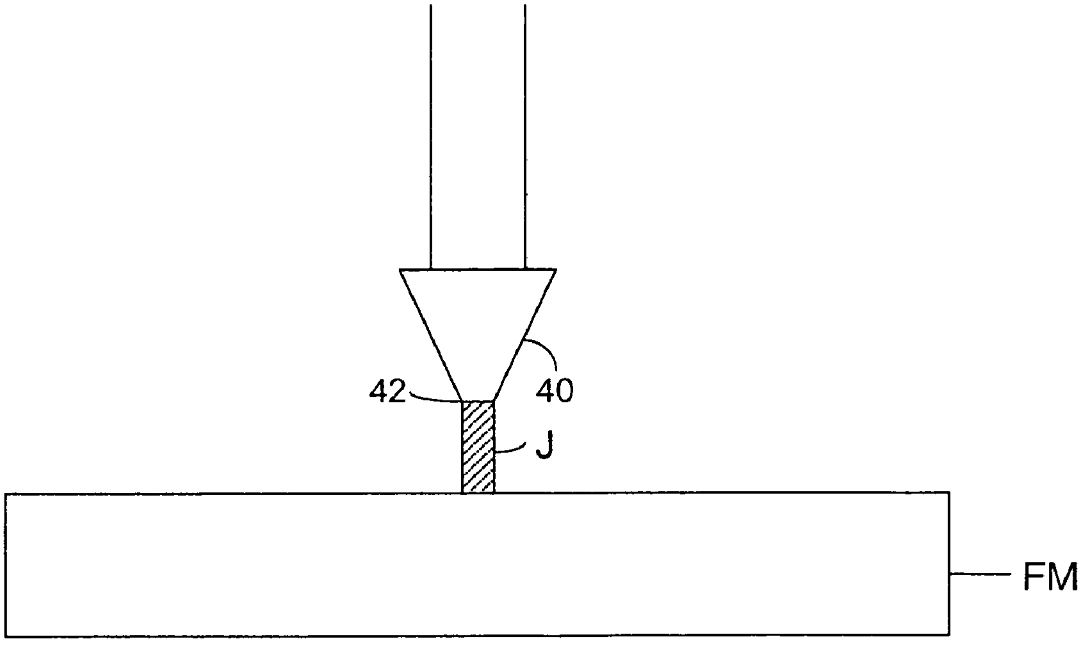
Figure 2C:
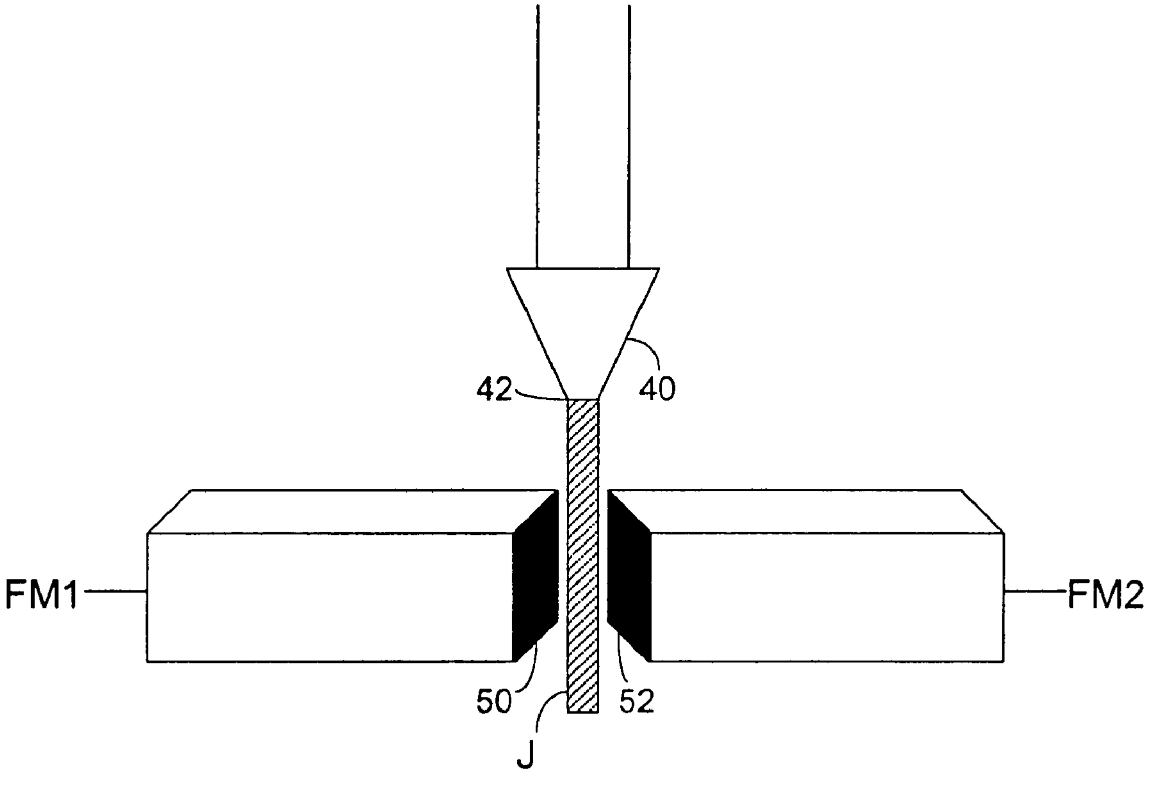

FIG. 2A shows a fibrous material mat M positioned below the nozzle 40 of the fluid jet cutting apparatus before the fluid jet J is emitted from the outlet of the nozzle. FIG. 2B shows the fibrous material mat M of FIG. 2A as a fluid jet stream J is emitted from the outlet 42 of nozzle 40 and contacting the fibrous material mat M along a cut path P. FIG. 2C shows the fibrous material mat M cut by the fluid jet stream J emitted from the nozzle 40 through its entire thickness thereby forming two separate fibrous material mats FM1, FM2.

As the fluid jet stream J cuts through the fibrous material mat M along cut path P, a coating composition, namely a polymer coating material, is simultaneously deposited on at least a portion of surface 50 of FM1 and surface 52 of FM2. According to certain embodiments, a substantially uniform coating of coating composition C is deposited along the entire area of surfaces 50, 52 of fibrous mats FM1, FM2, respectively. After the fibrous material mat FM has been split into two separate mats FM1, FM2, the two mats are dried by conventional means of drying inorganic fibrous material mats. During the mat drying process, the coating composition C that is deposited on surfaces 50, 52 provides a seal to the exposed edge surfaces of mats FM1, FM2. Forming the sealing coating on the surfaces 50, 52 of the cuts mats substantially eliminates the possibility of airborne particulate dust that is normally associated with die cutting or stamping of inorganic fibrous materials.

Also disclosed are exhaust gas treatment devices having a fragile catalyst support structure mounted within a housing by a fibrous mounting mat cut by the fluid jet cutting process. The mounting mat may be used to mount or support any fragile structure, such as a diesel particulate trap or the like. A diesel particulate trap includes one or more porous tubular or honeycomb-like structures (having channels closed at one end, however), which are mounted by a thermally resistant material within a housing. Particulate is collected from exhaust gases in the porous structure until regenerated by a high temperature burnout process. The term "fragile catalyst support structure" is intended to mean and include structures such as metal or ceramic monoliths or the like which may be fragile or frangible in nature and would benefit from a support element such as is described herein. One illustrative form of a device for treating exhaust gases is a catalytic converter. A catalytic converter includes a generally tubular housing. The housing includes an inlet at one end and an outlet at its opposite end. The inlet and outlet are suitably formed at their outer ends whereby they may be secured to conduits in the exhaust system of an internal combustion engine. The device contains a fragile catalyst support structure, which is supported and restrained within the housing by the mounting mat. The catalyst support includes a plurality of gas-pervious passages which extend axially from its inlet end surface at one end to its outlet end surface at its opposite end. The catalyst support may be constructed of any suitable refractory metal or ceramic material in any known manner and configuration.

The catalyst support is spaced from the housing by a distance or a gap, which will vary according to the type and design of the device, e.g., a catalytic converter or a diesel particulate trap, utilized. This gap is filled with a mounting mat to provide resilient support to the catalyst support. The mat provides both thermal insulation to the external environment and mechanical support to the catalyst support structure, protecting the fragile structure from mechanical shock.

EXAMPLES

The following illustrative examples are set forth to further describe the fluid jet apparatus and fluid jet cutting process. It should be noted that the fluid jet apparatus and cutting process should not be limited to the illustrative examples in any manner.

Example 1

A sample of a fibrous material mat sold by Unifrax Corporation under the designation CC-MAX 8 HP was cut using the fluid jet apparatus and process. The CC-MAX 8 HP fiber mat is a non-expanding mat of vitreous aluminosilicate fibers. This fiber mat is needle punched and does not contain any binder material. The CC-MAX 8 HP fiber mat is used to mount ceramic and metallic catalyst support substrates in automotive exhaust gas treatment devices. The CC-MAX 8 HP is disposed in the space between the automotive exhaust gas treatment device housing and the catalyst support substrate to provide thermal and mechanical shock resistance to the catalyst support substrate.

A 12 by 12 inch sample of the fiber mat was placed in the cutting area of the fluid jet cutting apparatus. The inlet water was pressurized to a pressure of 60,000 psi to create a high pressure water jet. The nozzle of the fluid jet was positioned above the fiber mat to be cut. A coating composition holding reservoir containing an acrylic latex was placed in fluid communication with the nozzle of the apparatus. The acrylic latex was delivered via conduit to the nozzle of the apparatus and was combined with the pressurized water. Once the nozzle was properly positioned above the fiber mat, the fluid jet containing water and latex material was emitted from the nozzle of the apparatus and was directed onto the surface of the fiber mat. The movement of the fluid jet was guided along a pre-determined cut path to produce substantially square pieces of cut fiber mat.

The cut fiber mat pieces were removed from the fluid jet cutting apparatus and were allowed to dry to remove any absorbed water from the cutting process. The cut and dried samples of fiber mat were analyzed for deposition of the coating on the edge surfaces exposed by the fluid jet cutting process. To analyze the amount of coating composition deposited onto the fiber surfaces exposed by the cutting process, the weight of the dried mat sample was first obtained. The dried mat sample was then heated to a temperature of approximately 700° C. for about 2 hours. The organic coating composition deposited on the mat sample was burned off during the heating of the mat. Following the heating of the mat sample, the mat sample was reweighed. The amount of coating deposited on the exposed surface edges of the mat sample during the fluid jet cutting process was calculated as the difference between the weight of the mat sample before heating and after heating the sample at 700° C. for 2 hours.

Examples 2-4

The effect of depositing an organic coating composition on the surfaces of the edges of fibrous substrates was analyzed.

Each of Example Nos. 2-4 comprised a fibrous material mat sold by Unifrax Corporation under the designation CC-MAX 8 HP. The CC-MAX 8 HP fibrous mat is a non-expanding mat of vitreous aluminosilicate fibers. This fiber mat is needle punched and does not contain any organic binder material.

Comparative Example No. 2 was cut by a die cutting process, with no organic coating composition deposited on the cut edge surfaces. Comparative Example No. 3 was also cut by a die cutting process. In an additional and separate step, the cut edge surfaces of the fibrous mat of Example No. C3 was spray coated with an organic coating composition. Example No. 4 was cut by the fluid jet cutting process whereby the pressurized fluid stream simultaneously cut the fibrous mat and deposited an organic coating composition on the cut edge surfaces. The robustness of each cut fibrous sample was evaluated. Each fibrous mat was assigned a number from 1 to 5 corresponding to the degree of robustness, with 5 representing the most robust. The results are shown in Table 1 below.

TABLE 1

| Example | Organic Content | Robustness |
|---|---|---|
| C2 | 0% | 1 |
| C3 | 0.30% | 3 |
| 4 | 1.15% | 5 |

Comparative Example No. 2 was not very robust. Comparative Example No. 3 having an organic coating spray-coated onto the cut edge surfaces of the fibrous mat showed in increase in initial robustness. However, it should be noted that the sprayed organic coating easily peeled off from the cut edge surfaces. Example No. 4 showed the best robustness of the three fibrous samples tested.

Examples 5-8

The effect of depositing an organic coating composition on the surfaces of the edges of fibrous substrates on the generation of airborne fibers was analyzed. The generation of airborne fibers was evaluated by wrapping a catalyst support substrate with a fibrous mat. The substrate was wrapped in an enclosed environment and the airborne fibers generated were collected on standard air monitoring filter media. The airborne fibers collected filter media were measured following the 7400(b) counting method described in the *NIOSH Manual of Analytical Methods.*

Example Nos. C5 and 6 comprised a fibrous material mat sold by Unifrax Corporation under the designation CC-MAX 8 HP. The CC-MAX 8 HP fibrous mat is a non-expanding mat of vitreous aluminosilicate fibers. This fiber mat is needle punched and does not contain any organic binder material.

Example Nos. C7 and 8 comprised a fibrous material mat sold by Unifrax Corporation under the designation CC-MAX 4 HP. The CC-MAX 4 HP fibrous mat is a non-expanding mat of vitreous aluminosilicate fibers. This fiber mat is processed with a binder. The fibrous mats of Example Nos. C7 and 8 contain approximately equal amounts of binder. The CC-MAX 4 HP fibrous mats were also provided with a support layer to increase the handleability of the mat structure.

Comparative Example Nos. C5 and C7 were cut by a die cutting process, with no organic coating composition deposited on the cut edge surfaces. Example Nos. 6 and 8 were cut by the fluid jet cutting process whereby the pressurized fluid stream simultaneously cut the fibrous mat and deposited an organic coating composition on the cut edge surfaces. The generation of airborne fibers during the cutting process was evaluated. The results are shown in Table 2 below.

TABLE 2

| Example | Organic content | Airborne fibers |
|---|---|---|
| C5 | 0% | 8650 |
| 6 | 1.15% | 2150 |
| C7 | — | 5800 |
| 8 | — | 1900 |

As Table 2 shows, the cutting fibrous substrates (Comparative Example Nos. C5 and C7) with traditional die cutting techniques results in the generation of a large amount of airborne fibers. By contrast, the fibrous mat of Example No. 6 cut by the fluid jet cutting process in which a coating is simultaneously deposited on the cut edge surfaces reduces airborne fiber generation to less than 25% of the fibers generated by die cutting Comparative Example No. C5.

Example Nos. C7 and 8 would not be expected release fibers, as they are fibrous mats processed with a binder to hold the fibers in place. Fluid jet cutting the fibrous mat of Example No. 8, however, results in a reduction in airborne fiber generation to 33% of the airborne fibers generated by die cutting the fibrous mat of Example No. C7. The results of the airborne fiber generation testing for Examples Nos. C7 and 8 demonstrates the advantage of depositing an edge treatment of a coating on binder-containing mats that would otherwise not be expected to release fibers.

The precision of the fluid jet cutting process was evaluated by analyzing the cut fibrous mat samples. 100 fibrous mat samples comprising a mat sold by Unifrax Corporation under the designation CC-MAX 8 HP were cut using the fluid jet cutting apparatus and process. The mounting mats were cut in a manner to provide a mat having a mating tab and slot arrangement. The width of the tab and slot on each cut fibrous mat was measured. The measurements of the cut fibrous mats indicate that the variation between the tab and slot width were 0.5 mm or less. These results demonstrate that the fluid jet cutting process provides fibrous mat structures having precise, clean cuts that are at least as precise as those attainable by traditional die cutting of fibrous mats. Accordingly, the fluid jet cutting process can be used to achieve precise cuts to meet predetermined application tolerances, with the added benefit of reduced airborne fiber generation.

According to the above examples, the fluid jet cutting process was used to cut a fibrous material article comprising alumino-silicate fibers. It should be noted, however, that the fluid jet cutting process may be used to cut fibrous material articles containing any type of inorganic fibers including, without limitation, alumina fibers, alumina-silica-magnesia fibers, calcia-magnesia-silica fibers, magnesia-silica fibers, calcia-alumina fibers, E-glass fibers, S-glass fibers, mineral wool fibers, mixtures thereof, and the like.

The process may also be utilized to simultaneously cut a fibrous material article and deposit an a desired agent or material, other than a sealing coating, on at least a portion of the fibrous material article being cut by the fluid jet stream. By way of illustration, and not in limitation, a material such as a colorant or dye, may be included in the fluid jet stream and simultaneously deposited on a portion of a fibrous material article as the article is cut by the fluid jet stream. According to other embodiments, an adhesive may be deposited on the cut edge surfaces by the fluid jet cutting process. The incorporation of a colorant or dye will enable the subsequent identification of the fibrous material article.

While the fluid jet cutting process has been described above in connection with certain illustrative embodiments, it is to be understood that other similar embodiments may be used or modifications and additions may be made to the described embodiments for performing the same function of the process without deviating therefrom. Further, all embodiments disclosed are not necessarily in the alternative, as various embodiments may be combined to provide the desired characteristics. Variations can be made by one having ordinary skill in the art without departing from the spirit and scope of the invention. Therefore, the process should not be limited to any single embodiment, but rather construed in breadth and scope in accordance with the recitation of the attached claims

We claim:

1. An exhaust gas treatment device comprising:

a housing;

a fragile catalyst support structure resiliently mounted within said housing; and a fluid jet cut inorganic fibrous mounting mat disposed in a gap between said housing and said fragile catalyst support structure for resiliently holding said fragile catalyst support structure within said housing, wherein said inorganic fibrous mounting mat comprises alumina fibers. alumino-silicate fibers, alumina-silica-magnesia fibers. calcia-magnesia-silica fibers, magnesia-silica fibers. calcia-alumina fibers, mineral wool fibers, and mixtures thereof.

2. The exhaust gas treatment device of claim 1, wherein a desired agent is deposited on at least a portion of said fluid jet cut inorganic fibrous mat.

3. The exhaust gas treatment device of claim 1. wherein said desired agent is selected from the group consisting of a coating, a colorant, a dye, an adhesive, or combinations thereof.

4. The exhaust gas treatment device of claim 3, wherein said desired agent is a coating.

5. The exhaust gas treatment device of claim 4, wherein said coating is deposited on at least a portion of fluid jet cut edge surfaces of said inorganic fibrous mat.

6. The exhaust gas treatment device of claim 5, wherein said coating is deposited as a substantially uniform layer on at least a portion of the fluid jet inorganic fibrous mat surface.

7. The exhaust gas treatment device of claim 6, wherein said coating composition is cured.

8. The exhaust gas treatment device of claim 5, wherein said coating composition comprises an organic polymer material.

9. The exhaust gas treatment device of claim 8, wherein said coating composition comprises a polymer material selected from the group consisting of acrylic polymers, methacrylic polymers, polyvinyl alcohol, starch polymers, urethane polymers, vinyl acetate polymers, and a latex.

10. The exhaust gas treatment device of claim 9, wherein said coating composition comprises an acrylic latex.

11. The exhaust gas treatment device of claim 1, wherein said inorganic fibrous material comprises alumino-silicate fibers.

12. The exhaust gas treatment device of claim 1, wherein said inorganic fibrous material comprises calcia-magnesia-silica fibers.

13. The exhaust gas treatment device of claim 1, wherein said inorganic fibrous material comprises magnesia-silica fibers.

14. The exhaust gas treatment device of claim 1, wherein said fragile catalyst support structure comprises a ceramic monolith.

15. The exhaust gas treatment device of claim 1, wherein said fragile catalyst support structure comprises a metallic monolith.

16. The exhaust gas treatment device of claim 1, wherein said exhaust gas treatment device comprises a catalytic converter.

17. The exhaust gas treatment device of claim 1, wherein said exhaust gas treatment device comprises a diesel particulate trap.

18. method for making an exhaust gas treatment device comprising:

mounting a fragile catalyst support structure within a housing with a fluid jet cut inorganic fibrous mounting mat that is disposed in a gap between said housing and said fragile catalyst support structure, wherein said inorganic fibrous mounting mat comprises alumina fibers, alumino-silicate fibers, alumina-silica-magnesia fibers, calcia-magnesia-silica fibers, magnesia-silica fibers, calcia-alumina fibers, mineral wool fibers, and mixtures thereof.

19. The method for making an exhaust gas treatment device of claim 18, wherein said inorganic fibrous mounting mat has a coating on at least a portion of fluid jet cut edge surfaces of said inorganic fibrous mat.

20. The method for making an exhaust gas treatment device of claim 19, wherein said coating composition comprises a polymer material selected from the group consisting of acrylic polymers, methacrylic polymers, polyvinyl alcohol, starch polymers, urethane polymers, vinyl acetate polymers, and a latex.

21. The method for making an exhaust gas treatment device of claim 20, wherein said coating composition comprises an acrylic latex.

22. The method for making an exhaust gas treatment device of claim 21, wherein said inorganic fibrous material comprises alumino-silicate fibers.

23. The method for making an exhaust gas treatment device of claim 21, wherein said inorganic fibrous material comprises calcia-magnesia-silica fibers.

24. The method for making an exhaust gas treatment device of claim 21, wherein said inorganic fibrous material comprises magnesia-silica fibers.

* * * * *